United States Patent [19]

Tsukahara et al.

[11] 4,019,774
[45] Apr. 26, 1977

[54] MOTORCYCLE FAIRING

[75] Inventors: Takeshi Tsukahara, Kawagoe; Minoru Morioka, Niiza; Yoichi Oguma, Asaka; Yoshitaka Omori, Wako, all of Japan

[73] Assignee: Honda Giken Kogyo Kabushiki Kaisha, Tokyo, Japan

[22] Filed: Oct. 24, 1975

[21] Appl. No.: 625,518

[30] Foreign Application Priority Data

Aug. 15, 1975 Japan .................. 50-99598

[52] U.S. Cl. .................. 296/78.1
[51] Int. Cl.² .................. B62J 17/00
[58] Field of Search .................. 296/78 R, 78.1

[56] References Cited

UNITED STATES PATENTS

| | | | |
|---|---|---|---|
| 3,154,342 | 10/1964 | Mueller | 296/78.1 |
| 3,787,088 | 1/1974 | Dreyer | 296/78.1 |
| 3,866,971 | 2/1975 | Hugon | 296/78.1 |

*Primary Examiner*—Joseph F. Peters, Jr.
*Assistant Examiner*—Gene A. Church
*Attorney, Agent, or Firm*—Haseltine, Lake & Waters

[57] ABSTRACT

A fairing of a sturdy structure designed to give a maximum of driving safety without impairing the steerability of the vehicle. The yoke structure to which a windshield is secured is comprised of a central rod and a pair of side rods secured to the front end thereof and includes a forwardly open U-shaped top formation within which an instrument panel is positioned, enabling the rider to observe the instruments without lowering the direction of his sight to any substantial extent. A light shield is arranged to prevent any reflection glare otherwise occurring on the inside surface of the windscreen when the instruments are illuminated during drive at night. The yoke structure is designed to be detachably connected with the body frame of the motorcycle at three locations thereon by simple fastening means. The windshield not only protects the rider from wind, rain and dust but is adapted to serve a number of additional functions. Namely, a pair of side reflectors are mounted outside the opposite side portions of the windshield and a pair of luggage boxes are detachably secured to the side shield portions on the inside thereof and, when removed, leave ample space for maintenance operation. The U-shaped top yoke formation serves also as frame means for protecting the instrument panel even if the motorcycle is accidentally turned sideways.

4 Claims, 11 Drawing Figures

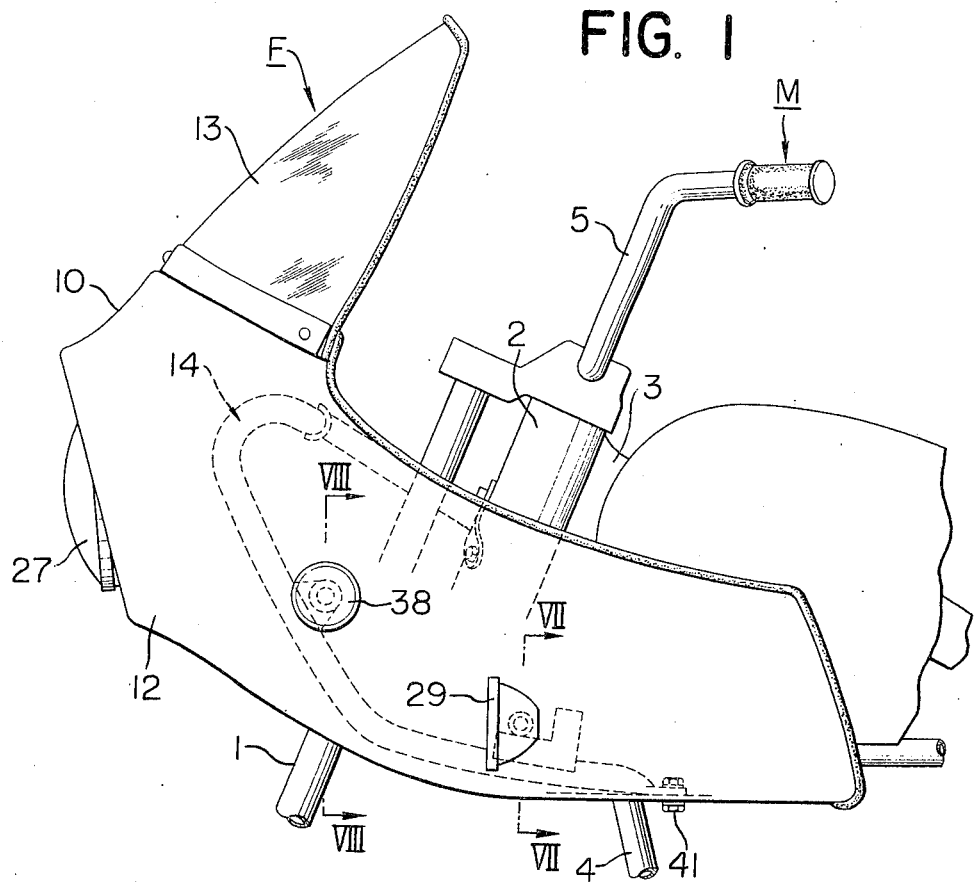
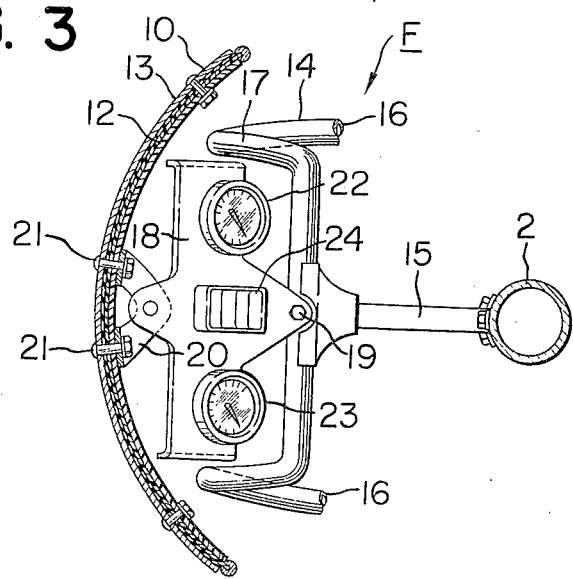

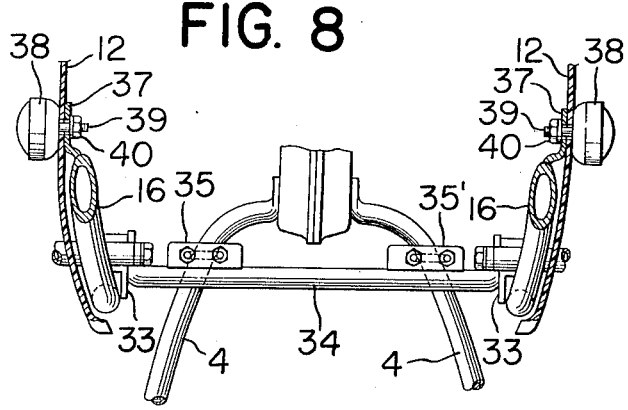
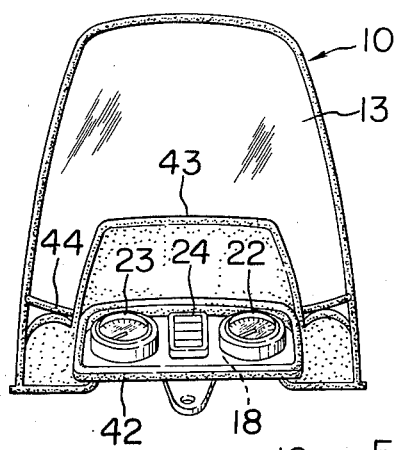
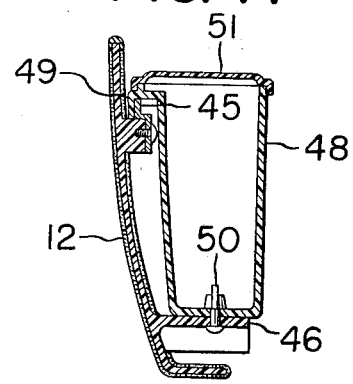
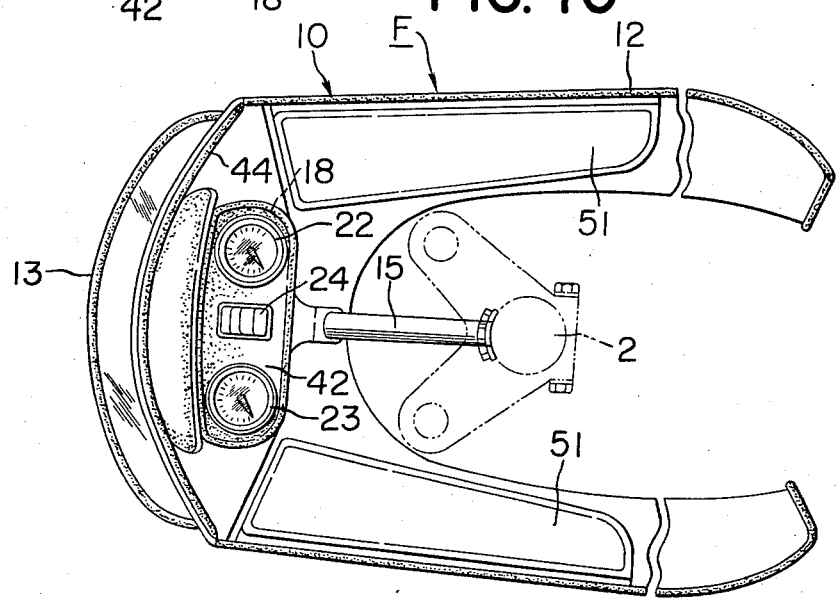

MOTORCYCLE FAIRING

FIELD OF THE INVENTION

The invention relates to a motorcycle fairing for protecting the driver.

BACKGROUND OF THE INVENTION

Various forms of fairings for motorcycles are well known in the art. Generally, however, they have had various disadvantages, principally because of their configuration and mounting structure; for example, inconvenience in their installation on the motorcycle, the tendency to make the rider's steering operation less free and light particularly when the vehicle is subjected to a severe wind, violent shocks or other external forces acting in different directions, limited visibility through the windshield, particularly at night, due to images of the lighted instruments formed on the inside surface of the windshield, and increase in labor required for maintenance operation including replacement of the headlight and instrument-illuminating lamp bulbs. Further, previous forms of motorcycle fairings have usually been intended exclusively to serve the purpose of protecting the rider and the instruments and other front components of the motorcycle from wind, rain and dust and limited in use.

SUMMARY OF THE INVENTION

The present invention seeks to overcome the disadvantages previously encountered as described above and provide an improved motorcycle fairing which is of sturdy structure and particularly adapted to enable the rider to drive with increased safety, ease and convenience.

The primary object of the present invention is to provide a motorcycle fairing which is mounted on the front portion of the body frame of a motorcycle to protect the rider from wind and rain as well as from dust while effectively reducing the wind resistance to the running movement of the vehicle, is of a sturdy structure not impairing the steerability of the vehicle to any extent, and enables the rider to observe the various instruments with increased ease while driving the vehicle.

Another object of the present invention is to provide a motorcycle fairing of the character described which includes a supporting yoke to which the windshield of the fairing is fixedly secured and which yoke is formed to serve also as a frame means for protecting a speedometer and other instruments mounted on the motorcycle, which are relatively fragile to external impact, so that the instruments may be kept safe from any damage as resulting from impact with exterior objects when the vehicle is accidentally turned sideways.

A further object of the present invention is to provide a motorcycle fairing of the character described which gives increased driving safety, particularly at night, with a pair of side reflectors mounted on the outside side portions of the windshield to enable the driver of any other vehicle approaching the motorcycle from either side thereof to notice the presence of the motorcycle without fail in time and is designed to utilize the mounting of the side reflectors to make the windshield more rigid and sturdier by strengthening the connection thereof with the supporting yoke, which interconnects the windshield with the frame of the motorcycle.

Another object of the present invention is to provide a motorcycle fairing of the character described which includes light shield means arranged between the windshield and the instruments mounted on a panel secured to the inside of the windshield. The light shield so arranged intercepts any light rays otherwise proceeding to the windshield directly from the instruments as illuminated at night to prevent formation of any image of the instruments on the inside surface of the windshield and resulting reduction in visibility therethrough and thus in effect increases the driving safety at night.

Yet another object of the present invention is to provide a motorcycle fairing of the character described which is designed to have an instrument panel and a headlight supported one above the other inside the front portion of the windshield and formed to define working spaces inside the right and left side portions of the windshield to facilitate maintenance operations including adjustment of the optical axis of the headlight and replacement of its lamp bulb or those fitted in the instrument panel and in which spaces luggage boxes for use in transporting various tools and other articles are readily removably mounted so that the external appearance of the motorcycle as a whole is substantially improved without involving any inconvenience in maintenance operation.

These and other objects, features and advantages of the present invention will become apparent from the following description when taken in conjunction with the accompanying drawings.

BRIEF DESCRIPTION OF THE DRAWINGS

The accompanying drawings illustrate one preferred embodiment of the invention.

In the drawings:

FIG. 1 is a fragmentary side elevation of a motorcycle embodying the invention;

FIG. 3 is a cross-sectional view taken along the line III—III in FIG. 2;

FIG. 8 is a cross section taken along the line VIII—VIII in FIG. 1;

FIG. 9 is a cross section taken along the line IX—IX in FIG. 2;

FIG. 10 is a cross section taken along the line X—X in FIG. 2; and

FIG. 11 is a cross section taken along the line XI—XI in FIG. 2.

DESCRIPTION OF THE PREFERRED EMBODIMENT

Figure 2:
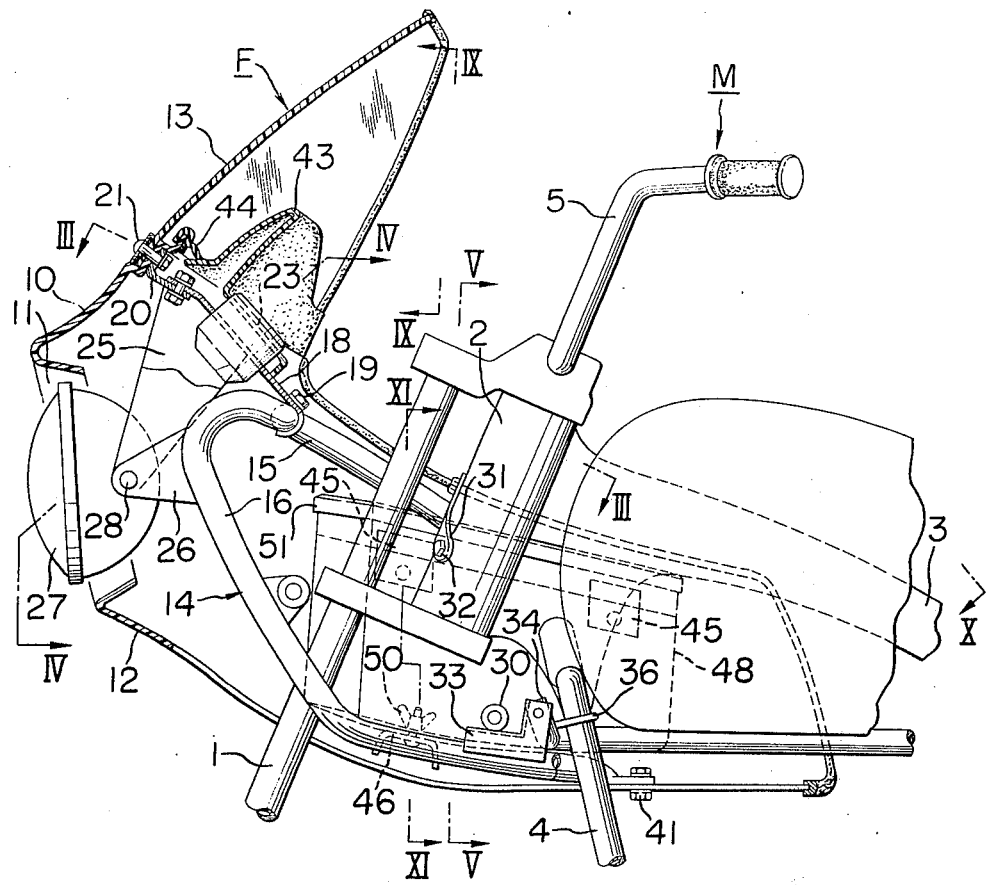
FIG. 2 is a fragmentary vertical cross-sectional view thereof.

Referring first to FIG. 1, there is illustrated a motorcycle M which is of an ordinary structure with the exception that no headlight, direction indicator lights or instruments are directly mounted on the framework of the vehicle and which includes a tubular head post 2 supporting a front fork 1, an upper frame member 3 extending rearwardly from the head post 2, and a pair of right and left lower frame members 4 both extending rearwardly from the head post 2 and laterally downwardly therefrom, with handle bars 5 secured to the top end of the head post 2 for steering movement together with the front fork 1.

Securely mounted on such front portion of the motorcycle M is a preferred form of fairing F embodying the present invention which includes as a main fairing structure a windshield 10 formed in the front portion thereof with an opening 11 for receiving a headlight 27, as clearly seen in FIG. 2. The windshield 10 is comprised of a generally U-shaped lower section 12 formed of a glass-fiber-reinforced plastic material and having a streamlined cross-sectional configuration suitable to cover the front body portion of the motorcycle M and an upper section or windscreen 13 formed of an appropriate transparent plastic material and joined at the bottom edge with the top of the lower windshield section 12 to extend vertically upwardly therefrom in a position in front of the steering handle 5 of the motorcycle M. The windshield 10 is mounted on the front portion of the vehicle through the medium of a supporting yoke 14, arranged inside the windshield 10, in the manner described below in detail.

Referring next to FIG. 3, the supporting yoke 14 comprises a framework including a central bar or rod member 15 and a pair of right and left side rod portions 16 (which may be portions of a single rod as shown) extending laterally from the front end of the central rod member 15 in opposite directions and forwardly in parallel with each other to jointly make a forwardly open U-shaped formation, as indicated at 17. The side rods 16 are further extended downwardly rearwardly as best seen in FIGS. 2 and 3. An instrument panel 18 is arranged in the U-shaped formation 17 and firmly secured at the rear end to the junction between the two side rods 16 by fastening bolt means 19. Also, the instrument panel 18 is firmly secured at its forward end to the overlapping edge portions of the upper and lower windshield sections 13 and 12 through the medium of an angular bracket 20 which is secured at the two front ends thereof to the overlapping edge portions of the two windshield sections 12 and 13 by bolt means 21, as shown in FIGS. 2 and 3. It will be readily noted that the instrument panel 18 secured in the manner described also serves as a member interconnecting the windshield 10 and supporting yoke 14.

The windshield 10 is also connected with the supporting yoke 14 intermediate the ends of the side rods 16 and at the rear ends thereof. As shown in FIG. 8, a pair of brackets 37 are secured to the respective side rods 16 intermediate the ends thereof as by welding and held in contacting relation with the respective adjacent inside surfaces of the opposite side portions of the lower windshield section 12. A pair of right and left side reflectors 38 have each a threaded bolt 39 extending axially rearwardly therefrom to fit through the apertured adjacent portion of the lower windshield section 12 and the adjacent one of brackets 37 with a nut 40 tightly threaded on the inwardly projecting end of bolt 39 to firmly clamp the side portion of windshield section 12 between the body of side reflector 38 and the bracket 37. As shown in FIG. 2, each of the side rods 16 of the yoke 14 is laid on the bottom portion of the lower windshield section 12 and firmly secured thereto by bolt means 41.

Figure 4:
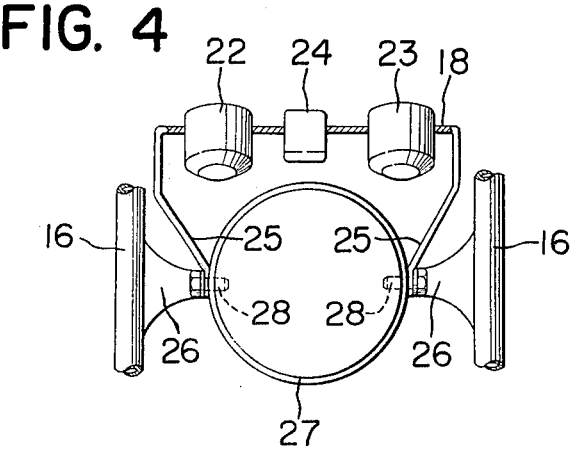
FIG. 4 is a cross section taken along the line IV—IV in FIG. 2.
Figure 5:
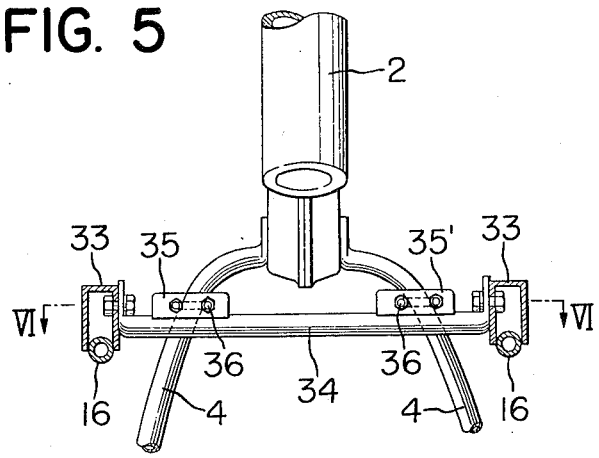
FIG. 5 is a cross section taken along the line V—V in FIG. 2.

Referring to FIGS. 2 and 4, the instrument panel 18 is bent downwardly at the right and left ends to form a pair of integral brackets 25 which are held at the bottom ends thereof in overlapping relation to the extreme ends of respective brackets 26, which are secured to the side rods 16 of the yoke 14 to extend forwardly inwardly thereof, and the overlapping ends of bracket 25 and 26 are secured to the opposite sides of the headlight 27, inserted in the opening 11 formed in the lower windshield section 12, by means of threaded bolts 28 to pivotally support the headlight 27. As will be apparent, the headlight 27 supported in this manner can be vertically swung about the transverse axis defined by the pair of aligned bolts 28 and the direction of the optical axis of the headlight 27 can be easily adjusted simply by loosening the bolts 28.

Referring to FIGS. 2 and 9, the instrument panel 18 is covered with a decorative plate 42 made of an appropriate opaque plastic material and having apertures formed therein to expose instruments set in the panel 18 such as a speedometer 22, a tachometer 23 and an alarm light 24. The decorative plate 42 is raised along the forward edge thereof to form a light shield 43 which extends upwardly in substantially parallel spaced relation to the windscreen or upper windshield section 13. A seal member 44 is secured to the inside of windshield section 13 with its edge or lip portion held in sealing engagement with the top surface of the front edge portion of the decorative plate 42 to prevent any light rays from the headlight 27 from leaking upwardly through the gap formed between the decorative plate 42 and the windshield 10.

As will readily be understood, even in the night, when illuminating lamps provided in the instruments 22, 23 and 24 are lighted, any portion of the lamp light which proceeds toward the upper windshield section 13 is intercepted by the light shield 43 and there occurs no formation of images of the lighted instruments on the inside surface of the windshield section 13. This means that the forward sight of the rider is not impaired to any substantial extent and kept clear even at night.

On the other hand, in the daytime, even when the vehicle runs facing the sun right ahead, any sunlight passing through the upper windshield section 13 in a direction toward the instruments is intercepted by the light shield 43 and there occurs no reflection glare on the top surface of the instruments which may dazzle the rider.

Figure 7:
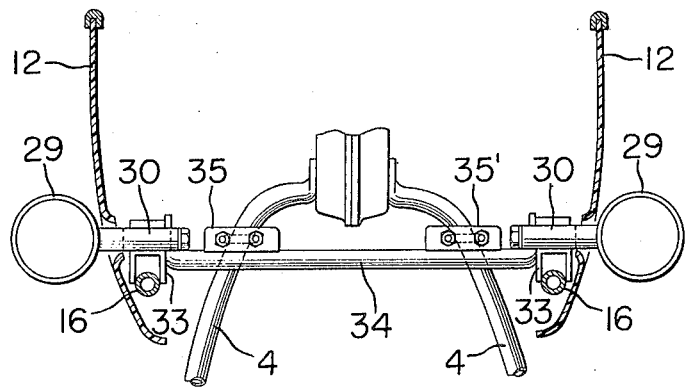
FIG. 7 is a cross section taken along the line VII—VII in FIG. 1.

Referring next to FIGS. 1, 2 and 7, a pair of right and left direction indicators or winkers 29 are secured to the rear portions of the side rods 16 of yoke 14 through the medium of respective mounting pipes 30 which project outwardly through the respective adjacent portions of the lower shield section 12, as best seen in FIG. 7.

Figure 6:
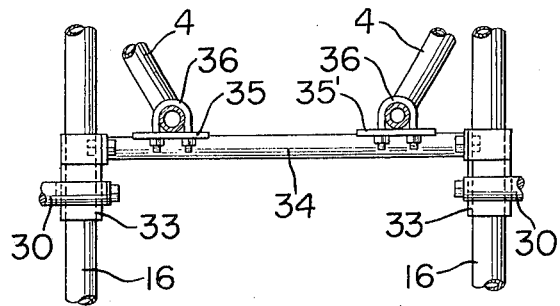
FIG. 6 is a cross section taken along the line VI—VI in FIG. 5.

Referring to FIG. 2, the central rod 15 of the yoke 14 is provided at its rear end with a first connection member 31 shaped to fit the cylindrical outer peripheral surface of the head post 2 of the motorcycle M and is detachably fixed to the front side of the head post 2 by means of fastening bolts 32. On the other hand, the two side rods 16 of yoke 14 each have an L-shaped bracket 33 fixed to the rear bottom portion thereof with a cross rod 34 detachably secured at its opposite ends to the brackets 33 (see FIGS. 5 to 8). A second and a third connection member 35 and 35' are firmly fixed to the cross rod 34 on the top side thereof so that the cross rod 34 may be detachably fixed to respective side members 4 of the motorcycle frame by means of U-bolts 36 (FIG. 6), which clamp the side frame members 4 tightly against the connection members 35 and 35'.

Referring next to FIGS. 2 and 11, the opposite side portions of the lower windshield section 12 are each provided on its inside with a pair of spaced front and rear latching brackets 45 and a support bracket 46 which is formed below the brackets 45 adjacent to the bottom of the windshield section 12 so that a pair of luggage boxes 48 of elongated rectangular form can be readily removably mounted on the windshield section 12 by the following procedure. To this end, each of the luggage boxes 48 is formed at its top along one longitudinal edge thereof with a downwardly bent hook 49, which is brought into engagement with the latching brackets 45 to latch the top portion of luggage box 48 on the inside of the lower windshield section 12. The luggage box 48 is then deposited on the support bracket 46 and finally the bottom wall of the box 48 is firmly fixed to the bracket 46 by thumbnut means 50 threadedly engaging a threaded bolt fitted through the bracket 46 and the bottom wall of the box. Reference numeral 51 indicates a top cover plate provided on the luggage box 48.

As will readily be understood, an ample space can be obtained inside each of the side portions of the fairing F of the above-described construction whenever desired for maintenance operation simply by loosening off the thumb nut 50 and dismounting the luggage box 48 from the lower windshield section 12. Accordingly, the rider can work, whenever required, expediently through such space to adjust the optical axis of the headlight by releasing the bolts 28 with an appropriate tool or to replace any burnt-out lamp bulb in the instrument panel 18 or the headlight 27.

During running of the motorcycle with the fairing F mounted thereon, the supporting yoke 14 is obviously subjected to various external forces acting in different directions, including wind pressure acting on the windshield 10 and impacting or vibratory forces unavoidably transmitted from the body frame of the motorcycle due to surface irregularities, but can withstand such forces fully satisfactorily owing to the fact that the yoke 14 is solidly connected with the frame of the motorcycle at the three apexes of an isoceles triangle generally defined by the head post 2 and the two lower frame members 4 of the vehicle, that is, at the first, second and third connections 31, 35 and 35'. In this manner, external forces acting upon the yoke 14 are all sustained by the central and side rods 15 and 16 of the yoke as a compressive or tensile force acting through such yoke members. Further, the weight of the entire fairing structure and such external forces acting thereon as referred to above are supported by the head post 2 and lower frame members 4 and never act directly on the front wheel fork 1 or the steering handle 5. Further, the headlight 27, direction indicator winkers 29 and instrument panel 18, which have heretofore been usually mounted on top of the front fork 1, are all carried by the fairing structure F, as described hereinbefore. Because of the fairing structure and the arrangement thereon of various lights and instruments, the whole weight of the steering handle 5 and associated parts is materially reduced, enabling extraordinarily light and smooth steering operation.

To summarize, the motorcycle fairing of the present invention is of a structure sturdy enough to withstand any external forces such as wind resistance and mechanical shocks and can be expediently mounted on the motorcycle frame by means of a yoke 14 designed to be firmly secured thereto only at three points. Further, the fairing windshield 10 has a pair of right and left light reflectors 38 mounted on the opposite side portions thereof which serve at night to reflect light beams from any vehicle approaching the motorcycle M from either side thereof, thereby enabling the driver of the vehicle to notice the presence of the motorcycle M and chances of such vehicle coming into collision with the motorcycle M equipped with the windshield 10 are minimized. In addition, as the side reflectors 38 are fixed to the respective brackets 37, provided on the windshield supporting yoke 14, so as to tightly clamp the windshield 10 against the brackets 37 and thus serves as an additional means for fixing the windshield 10 to the yoke 14 to make the connection therebetween more solid. With such construction, it will also be readily appreciated that the side reflectors 38, being secured to the yoke 14, are kept free from any such vibration as otherwise occurring when the windshield 10 is caused to vibrate or flutter during running of the motorcycle and are kept at all times tightly fixed in place.

Further, the windshield-supporting yoke 10 is partly formed in a U-shaped configuration 17 to accommodate an instrument panel 18. The U-shaped yoke portion 17 serves as a simple means for protecting the instrument panel 18, eliminating any need of providing a special protecting frame therefor. In other words, owing to the U-shaped yoke formation, the instrument panel 18 is kept free from the danger of being crashed or scratched against the road surface or other objects even if the motorcycle is accidentally turned sideways and, in this manner, any damage of the instruments is effectively avoided. Also, the U-shaped formation 17 is provided at the front end of the central post 15 of yoke 14, which extends forwardly from the head post 2 of the motorcycle M, so that the instrument panel 18 is arranged in a position substantially spaced forwardly from the head post 2. As will readily be appreciated, this arrangement of instrument panel 18 is advantageous over the prior art arrangement, in which the instrument panel has been positioned nearly directly above the head post 2, in that it enables the rider to see the instruments on the panel 18 easily without lowering the direction of sight to any substantial extent and thus gives an increased driving safety.

Though one preferred embodiment of the present invention has been shown and described, it will be apparent to those skilled in the art that various changes and modifications may be made therein as required without departing from the spirit of the present invention or the scope of the appended claims.

What is claimed is:

1. A fairing for a motorcycle having a tubular head post with left and right handlebars, and a pair of left and right side frame members extending rearwardly and downwardly, said fairing comprising: a windshield including a lower section shaped to cover the front portion of the motorcycle to which the fairing is fitted and an upper transparent section connected to said lower section so as to be upstanding therefrom and disposed in front of the handle bars of the motorcycle, a supporting yoke fixedly secured to the inside of the windshield, an instrument panel supported by said yoke in a position below said upper windshield section on the inside thereof, said yoke comprising a framework including a central rod having a rear end detachably connected to and extending forwardly from said head post, and a pair of side rod portions initially extending laterally from the front end of said central rod in opposite directions and then forwardly together to form a forwardly open U-shaped yoke portion within which said instrument panel is disposed, said side rod portions further extending downwardly and rearwardly from said U-shaped yoke portion for detachable connection at the rear ends to the frame of the motorcycle at respective locations thereon so as to define, together with the connection point of said central rod with said head post, three apexes of an isosceles triangle, a headlight mounted in an opening provided in the front portion of said lower windshield section, a pair of left and right direction indicators disposed outside opposite side portions of said lower windshield section, and connection means on said supporting yoke for detachably connecting the latter to said head post and to the bottom portions of the side frame members of the motorcycle, respectively.

2. A motorcycle fairing as claimed in claim 1 further comprising a pair of brackets secured to said supporting yoke and a pair of side reflectors secured to said brackets such that adjacent side portions of said lower windshield section is engaged between said reflectors and said respective brackets.

3. A motorcycle fairing as claimed in claim 1 further comprising an upstanding light shield mounted between said upper windshield section and the instrument panel.

4. A motorcycle fairing as claimed in claim 1 further comprising means for supporting the instrument panel and the headlight of the motorcycle one above the other inside the front portion of said windshield and means inside the left and right side portions of said lower windshield section for detachably mounting a pair of luggage boxes thereon.

* * * * *